United States Patent [19]

Leonard et al.

[11] Patent Number: 4,907,887
[45] Date of Patent: Mar. 13, 1990

[54] HIGH RESOLUTION INTERFEROMETER WITH HIGH ETENDUE

[75] Inventors: Donald A. Leonard, Cupertino; Harold E. Sweeney, Menlo Park, both of Calif.

[73] Assignee: GTE Government Systems Corporation, Stamford, Conn.

[21] Appl. No.: 269,816

[22] Filed: Nov. 10, 1988

[51] Int. Cl.[4] .............................................. G01B 9/02
[52] U.S. Cl. .................................... 356/352; 356/236
[58] Field of Search ................. 356/352, 236; 250/228

[56] References Cited

U.S. PATENT DOCUMENTS 3,795,448  3/1974  Fletcher et al. ................. 356/352 X

OTHER PUBLICATIONS

Paul et al., "Rapid Velocity Sensor Using a Static Confocal Fabry-Perot and a Single Frequency Argon Laser", *J. Phys. E*, vol. 4, No. 3, pp. 170–172, 3/71.

Primary Examiner—Davis L. Willis
Assistant Examiner—Matthew W. Koren
Attorney, Agent, or Firm—Douglas M. Gilbert; John F. Lawler

[57] ABSTRACT

The etendue (throughput or area-solid angle product) of a high resolution interferometer is maintained at a substantially high level by use of a transparent chamber defined by a highly reflective internal surface, the chamber being located at the input to the interferometer. The chamber has an input aperture to admit light into the chamber and an output aperture or exit opening to pass light to the interferometer. By integrating the input light through multiple reflections thereof within the chamber until it exits to the interferometer, the etendue of the latter is substantially enhanced.

7 Claims, 1 Drawing Sheet

HIGH RESOLUTION INTERFEROMETER WITH HIGH ETENDUE

This invention was made with Government support under Contract No. N00014-87-C-0739 awarded by the Department of the Navy. The Government has certain rights in this invention.

BACKGROUND OF THE INVENTION

1. Field of the Invention

The present invention relates to optical interferometers, and more particularly to an improved Fabry-Perot (F-P) interferometer.

2. Description of the Prior Art

The interferometer has long been used to resolve wavelengths precisely and is still a major tool for spectroscopy. Highest resolution is obtained with the use of multipass (multierflection) interferometers such as the Fabry-Perot (F-P) interferometer which is described in detail in LASERS & OPTRONICS, May 1987, Gordon Publications, Inc., Dover, NJ, pages 57-60. This device uses an etalon having partially-reflecting partially-transmitting mirrors arranged so that light of the desired wavelengths constructively interfere and light of other wavelengths destructively interfere to produce very sharp fringe patterns.

In a single zone F-P interferometer, a mask with a pinhole is placed at the focal point of a lens following the interferometer. The pinhole aperture admits only the set of wavelengths which constructively interfere at the incident angle represented by the pinhole. This severely limits the angle of acceptance of the incident light and has a major negative impact on the etendue or throughput of the device.

A multi-zone F-P interferometer uses a mask, as explained below, in the lens focal plane which admits only light at incident angles associated with the different orders of constructive interference. Since more light is admitted with this device, the etendue is improved in proportion to the number of zones provided. Nevertheless, a trade-off still exists between the resolution and the total acceptance solid angle; a higher finesse [ratio of the distance to the next order constructive interference (fringe) to the width of the fringe] reduces the width of each acceptance angle. The mask takes the form of a series of concentric transparent rings or annuli which are positioned to admit only light at the desired wavelength. Other wavelengths interferring at other angles are blocked by the non-transmitting portion of the mask.

The multi-zone F-P interferometer then accepts only signals within a series of discrete angular rings or zones about the optical axis. Light at the desired wavelengths but at other angles do not pass through the interferometer but are reflected back from it.

This invention is directed to an improved F-P interferometer which recovers these otherwise lost or reflected wavelengths.

OBJECTS AND SUMMARY OF THE INVENTION

A general object of the invention is the provision of a F-P interferometer with high etendue but without otherwise adversely affecting the performance of the instrument.

Another object is the provision of such an improvement to an interferometer that is simple and relatively inexpensive.

In accordance with the teachings of the present invention, these and other objects are achieved through provision of a hollow spherical chamber having a highly reflective diffuse internal surface (integrating sphere) positioned at the input to the interferometer. This spherical surface integrates the input light by repeated reflections thereof until substantially all of the input light enters the interferometer thereby greatly enhancing the etendue thereof.

BRIEF DESCRIPTION OF THE DRAWINGS

For a better understanding of the invention as well as other objects and further features thereof, reference is made to the following description which is to be read in conjunction with the accompanying drawings wherein.

DESCRIPTION OF PREFERRED EMBODIMENT

Figure 1:
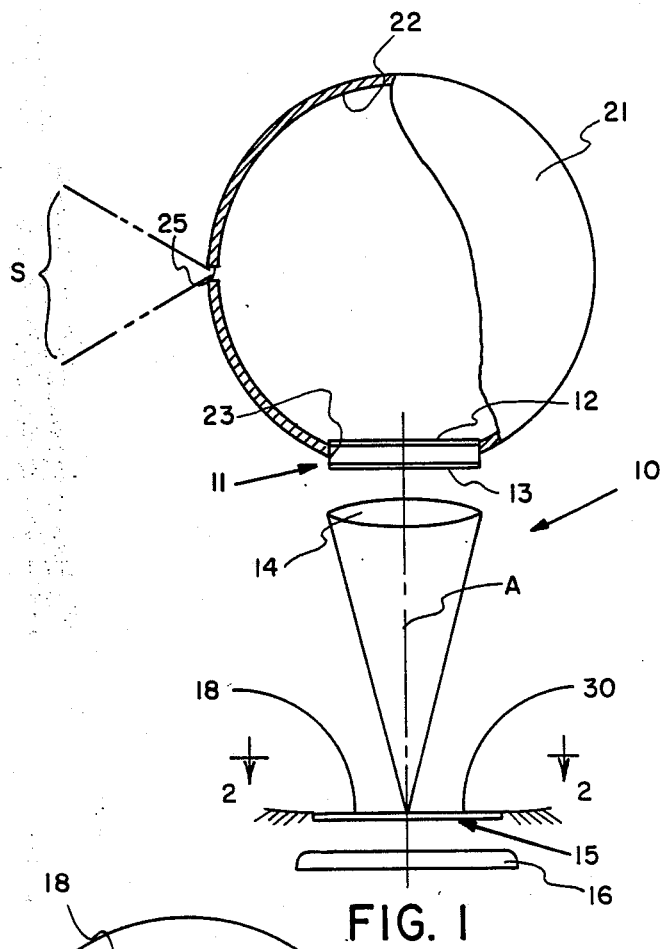
FIG. 1 is a schematic view of an F-P interferometer embodying this invention.
Figure 2:
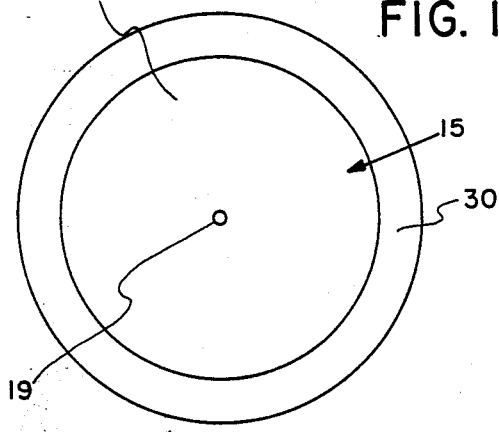
FIG. 2 is a plan view of a single-zone mask at the output end of the interferometer, the view being taken on line 2—2 of FIG. 1.

Referring now to the drawings, FIG. 1 shows an F-P interferometer 10 having an optical axis A and comprising an etalon 11 with two flat parallel spaced partially transmitting input and output mirrors 12 and 13, respectively, a lens 14, a mask 15 and a photodetector 16 aligned along axis A. Mask 15, shown in more detail in FIG. 2, is located in the focal plane of lens 14 and has an opaque surface 18 (mirrored) and a pinhole 19 therein on axis A. Detector 16 by way of example may be a photomultiplier, photodiode, or any optical detector suitable for the wavelength used.

In accordance with this invention, a hollow container 21 having a highly reflective diffuse internal surface 22 defining a spherical chamber C is located between a source of light S and input mirror 12 of etalon 11. Container 21 has an opening 23 centered along axis A for receiving etalon input mirror 12 and has an input aperture 25 adjacent to light source S through which light is admitted into container 21.

In operation, interferometer input light from source S enters container 21 through aperture 25 and is multiply reflected by the diffuse spherical surface 22 with the only unintended escape being the small probability of exiting entrance aperture 25. The reflected rays that are incident on etalon input mirror 12 and that are at favorable angles, i.e. favorable for admission to and through pinhole 19, are transmitted by etalon output mirror 13 to mask 15 and through pinhole 19 to detector 16. On the other hand, those rays at unfavorable angles to exit pinhole 19 are reflected back by etalon 11 and mirrored mask 15 into container 21 where their angles are scrambled and ultimately redirected to the surface of etalon mirror 12. Again some rays are favorable and exit the chamber while others are re-reflected back into the chamber. This process continues until substantially all of the light which has been admitted through container aperture 25 is passed through interferometer 10 and is detected. To the extent that the losses in the integrating container 21 can be reduced, the etendue of the system can be made as large as desired independent of the resolution of interferometer 10.

Figure 3:
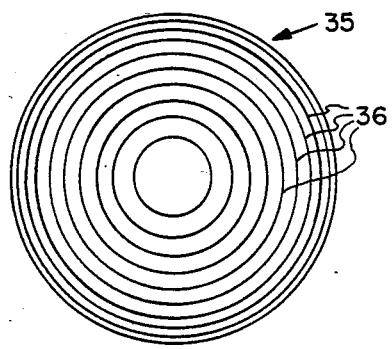
FIG. 3 is a view similar to FIG. 2 showing a multi-zone mask.

FIG. 3 shows a multi-zone mask 35 having a plurality of concentric transparent rings 36 in the form of F-P fringes. Although all of the rays, which are first reflected and then scrambled by the integrating sphere, ultimately exit the pinhole, the multizone mask allows more rays to exit each bounce. This modification increases the efficiency of light gathering in proportion to the number of zones used.

A further refinement of the system is a reflector 30 around mask 15, shown as a concave annulus. Annulus 30 serves to reflect higher order zones back through the interferometer and into container 21 Such modification simplifies mask fabrication because fewer zones need to be included to capture all of the incident light.

While the invention has been described wth reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings. For example, although the invention is described with a parallel-plate or plano-interferometer, a spherical or con-focal F-P interferometer could also be used with a suitable mask modification. Also, other closed geometric shapes, such as a cylinder, may be substituted for the spherical integrating chamber.

What is claimed is:

1. In a Fabry-Perot interferometer comprising an etalon having an optical axis, a source of light on one side of said etalon and positioned to direct said light against said etalon, a lens on the side of said etalon opposite said one side and aligned with said optical axis, a mask traversing said axis at the focal plane of said lens, and optical utilizing means on the other side of said mask opposite from said lens, said mask having a light-transmitting portion adapted to pass light having a predetermined wavelength from said lens to said utilizing means, the improvement consisting of:

a container having an internal light-reflecting chamber between said source and said one side of said etalon, said container having a reflective diffuse internal surface and an entrance aperture facing said source for admitting light into said container;

said one side of said etalon being exposed to the interior of said container whereby light from said source reflected within said container is incident on said etalon.

2. The interferometer according to claim 1 in which said internal surface of said container is spherical.

3. The interferometer according to claim 2 in which said portion of the mask is a pinhole.

4. The interferometer according to claim 2 in which said portion of the mask comprises a plurality of transparent concentric rings positioned to admit light at predetermined wavelengths.

5. The interferometer according to claim 2 in which the part of said mask around said portion is light-reflective.

6. The interferometer according to claim 2 with a reflector around the outer edge of said mask.

7. The interferometer according to claim 6 in which said reflector is a concave annulus.

* * * * *